United States Patent [19]

Lequime

[11] Patent Number: 5,200,796
[45] Date of Patent: * Apr. 6, 1993

[54] METHOD AND APPARATUS FOR DETECTING AND MEASURING A PHYSICAL MAGNITUDE

[75] Inventor: Michel R. Lequime, Eguilles, France

[73] Assignee: Bertin & Cie, Plaisir, France

[*] Notice: The portion of the term of this patent subsequent to Mar. 21, 2006 has been disclaimed.

[21] Appl. No.: 582,893

[22] PCT Filed: Feb. 14, 1990

[86] PCT No.: PCT/FR90/00105
§ 371 Date: Oct. 9, 1990
§ 102(e) Date: Oct. 9, 1990

[87] PCT Pub. No.: WO90/09564
PCT Pub. Date: Aug. 23, 1990

[30] Foreign Application Priority Data

Feb. 14, 1989 [FR] France .................. 89 01900

[51] Int. Cl.⁵ ............................................. G01J 3/45
[52] U.S. Cl. .................................... 356/346; 356/345; 356/351; 356/367; 250/227.11; 374/161
[58] Field of Search ............... 356/346, 351, 345, 367; 250/227, 225, 226; 374/161

[56] References Cited

U.S. PATENT DOCUMENTS

4,814,604  3/1989  Lequime ........................ 356/346
4,867,565  9/1989  Lequime ........................ 356/346

FOREIGN PATENT DOCUMENTS

251632  1/1988  European Pat. Off. .
3044183  6/1982  Fed. Rep. of Germany .
3623265  1/1988  Fed. Rep. of Germany .
2144534  3/1985  United Kingdom .

*Primary Examiner*—Samuel A. Turner
*Assistant Examiner*—LaCharles Keesee
*Attorney, Agent, or Firm*—Bell, Seltzer, Park & Gibson

[57] ABSTRACT

A method and apparatus for measuring a physical magnitude by means of an incoherent light source (10), an interferometric sensor (14) modulating the spectrum of the light beam emitted by the source at a characteristic frequency which is a function of the magnitude to be measured, a demodulator interferometer (18), and spectrum analysis means (22) having optical resolution making them insensitive to the modulation frequencies generated by the sensor (14) and the demodulator interferometer (18), and sensitive to the difference therebetween. The invention is particularly applicable for measuring physical magnitudes such as temperature, motion, electric field, etc.

13 Claims, 1 Drawing Sheet

METHOD AND APPARATUS FOR DETECTING AND MEASURING A PHYSICAL MAGNITUDE

The invention relates to a method and to apparatus for detecting and measuring a physical magnitude by means of sensors each comprising an element sensitive to the magnitude to be measured, and having a spectral transfer function which varies as a function of said magnitude, such sensors being illuminated by a beam of incoherent light and transmitting light signals to spectrum analysis means whereby the value of the physical magnitude is determined.

Methods and apparatuses of this nature are already described, for example in the Applicant's U.S. Pat. Nos. 4,814,604 and 4,867,565, in which the sensors used are of the interferometric type performing periodic modulation of the light spectrum that they transmit, with the modulation being at a characteristic modulation frequency which varies as a function of the physical magnitude to be measured. The analysis means are also of the interferometric type and serve to demodulate the light flux from the sensors by a Fourier transform. This optical Fourier transform of the light flux modulated by the sensor enables the characteristic modulation frequency in the sensor to be detected, thus detecting the value of the physical magnitude to be measured.

The object of the present invention is to provide a method and apparatus of the same type but making use of different means for analyzing the light flux from the sensors.

Another object of the invention is to provide a method and an apparatus of this type making it possible to achieve multiplexing and demultiplexing of the signals emitted by various sensors subjected to a physical magnitude to be measured.

To this end, the invention provides a method of detecting and measuring a physical magnitude, the method consisting in using a source of incoherent light to illuminate a sensor of the interferometric type and sensitive to the magnitude to be measured, in modulating in periodic manner the spectrum of the light flux passing through the sensor at a frequency which is a function of the magnitude to be measured, then in statically demodulating the light flux leaving the sensor by means of a demodulator interferometer, and in analyzing the demodulated light flux spectrum to deduce the value of the physical magnitude therefrom, the method being characterized in that it consists in using demodulated flux spectrum analysis apparatus having optical resolution such as to be insensitive to modulation frequencies generated by the sensor and by the demodulator, and in analyzing solely that modulation in the demodulated signal which is characteristic of a beat frequency between the spectrum modulation due to the sensor and that due to the demodulator.

The method of the invention thus makes is possible to use a spectrum analysis apparatus of relatively low resolution to obtain the value of the physical magnitude to be measured by combining the characteristic modulation in the sensor with a fixed demodulation frequency, rather than analyzing said characteristic modulation directly.

Depending on circumstances, providing the beat frequency is relatively large and greater than the reciprocal of the spectrum bandwidth of the light source, the method may consist in measuring the period and the phase of said characteristic beat modulation in the demodulated signal, otherwise, when said beat frequency is relatively low and less than the reciprocal of the spectrum bandwidth of the light source, the method may consist in measuring the apparent color of the demodulated light flux.

The value of the physical magnitude to be measured may thus be obtained either by conventional means for measuring phase and period, or else by spectrocolorimeter means as described in the Applicant's French patent number 2 588 656.

Advantageously, the method also consists, prior to measuring the intensity of the non-modulated portion of the flux from the demodulator, in adjusting the demodulator or the sensor so that the spectrum analysis becomes insensitive to the above-mentioned beat frequency, and then, with the sensor subjected to the physical magnitude to be measured, in multiplying the demodulated light flux by the reciprocal of the non-modulated portion of the flux in order to obtain a signal to be analyzed which is independent, in particular, form the spectral transfer function of the set of means used.

The method also consists in eliminating the high frequency noise present in the signal to be analyzed, e.g. by means of Fourier smoothing.

These operations are preferably performed by calculation in a data processing system.

Finally, the method of the invention also consists in connecting the light source and the demodulator to a plurality of sensors disposed in parallel and having different characteristic modulation frequencies, and in tuning the demodulator successively to each of the sensors.

This provides a simple way of multiplexing and demultiplexing signals from a plurality of sensors subjected to the physical magnitude to be measured.

The invention also provides an apparatus for detecting and measuring a physical magnitude, in particular by performing the above method, the apparatus comprising a source of incoherent light, and interferometric sensor sensitive to the magnitude to be measured and performing periodic spectrum modulation on the light flux emitted by the source, said modulation being at a frequency which is a function of the magnitude to be measured, static demodulation means for demodulating the light flux transmitted by the sensor, e.g. a demodulator interferometer, means for performing spectrum analysis on the demodulated light flux, and optical fibers for interconnecting the source, the sensor, the demodulation means and the spectrum analysis means, the apparatus being characterized in that the optical resolution of the analysis means is such as to ensure they are insensitive to modulation frequencies generated by the sensor and by the demodulation means, and are sensitive to the difference between said frequencies.

Depending on circumstances, the spectrum analysis means may include means for calculating the period and the phase of the characteristic modulation in the analyzed signal, and the beat frequency between the modulation due to the sensor and due to the demodulation means, or else it may include means for measuring the apparent color of the demodulated light flux.

Means are provided for eliminating high frequency noise in the demodulated flux, e.g. calculation means performing Fourier smoothing on the flux.

The apparatus may include a plurality of sensors connected in parallel between the light source and the demodulation means, said sensors having different characteristic modulation frequencies, with the demodulation means being suitable for being tuned successively to each sensor.

The invention will be better understood and other details, characteristics, and advantages thereof will appear more clearly on reading the following description given by way of example and made with reference to the accompanying drawing, in which.

Figure 1:
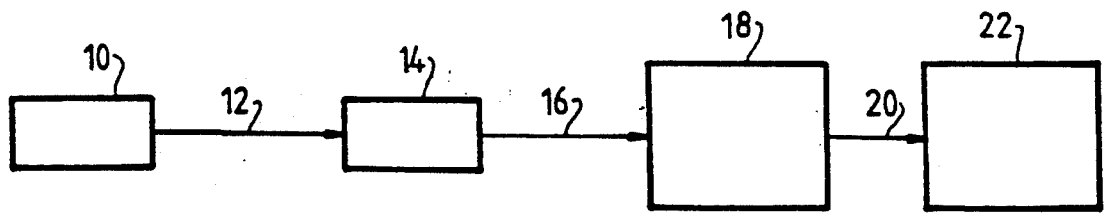
FIG. 1 is a diagram of apparatus of the invention.

Reference is made initially to FIG. 1 in which reference 10 designates a source of incoherent light.

This light source 10 is connected via an optical fiber 12 to a sensor 14, e.g. of the interferometric type, which sensor is sensitive to the physical magnitude to be measured. This physical magnitude may, for example, be temperature, motion, electric field, etc. . . .

The sensor 14 performs periodic spectrum modulation on the light flux emitted by the source 10, the modulation being performed at a characteristic frequency which varies as a function of the physical magnitude to be measured. The sensor 14 is itself connected by an optical fiber 16 to a demodulator system 18 such as a static demodulation interferometer which produces a light signal which is transmitted by an optical fiber 20 to spectrum analysis means 22.

As mentioned above, these spectrum analysis means 22 may be constituted, for example, by an optical fiber spectrocolorimeter as described in the Applicant's French patent number 2 588 656. The light flux transmitted by the sensor 14 is given by the following equation:

$$B'(\sigma) = \tfrac{1}{2} B(\sigma) \cdot t_1(\sigma)[1 + \cos 2\pi\sigma\Delta 9 x)]$$

where:

$B'(\sigma)$ is the flux emerging from the sensor 14;

$x$ is the magnitude to be measured;

$\Delta(x)$ is the variable path length difference inside the sensor 14;

$\sigma$ is the wave number $B(\sigma)$ is the light flux emitted by the source 10; and $T_1(\sigma)$ is the spectral transfer function of the assembly constituted by the optical fiber 12 and the sensor 14.

Similarly, the light flux leaving the demodulating interferometer 18 is written:

$$B''(\sigma) = \tfrac{1}{2} B'(\sigma) \cdot T_2(\sigma)[1 + \cos 2\pi\sigma\Delta_0]$$

where:

$B''(\sigma)$ is the flux leaving the demodulator 18;

$\Delta_0$ is the fixed path length difference in the demodulator 18; and $T_2(\sigma)$ is the spectral transfer function of the assembly constituted by the optical fiber 16 and the demodulator 18.

This equation can also be written:

$$B''(\sigma) = \tfrac{1}{4} B(\sigma) \cdot T(\sigma) \cdot [1 + \cos 2\pi\sigma\Delta(x) + \cos 2\pi\sigma\Delta_0 + \tfrac{1}{2}\cos 2\pi\sigma(\Delta_0 - \Delta(x)) + \tfrac{1}{2}\cos 2\pi\sigma(\Delta_0 + \Delta(x))]$$

where: $T(\sigma) \cdot T_2(\sigma)$.

The spectrum analysis apparatus 22 is designed in such a manner that its optical resolution is not high enough for it to be sensitive to the modulation frequencies generated by the sensor 14 and the demodulator 18, which corresponds to the following conditions:

$$\delta\sigma \cdot \Delta(x) >> 1$$

$$\delta\sigma \cdot \Delta_0 >> 1$$

where $\delta\sigma$ is the optical resolution of the spectrum analysis apparatus 22.

The spectrum recorded by the spectrum analysis apparatus is then written as follows:

$$S(\sigma) = \tfrac{1}{4} B(\sigma) \cdot T(\sigma)[1 + \tfrac{1}{2}\cos 2\pi\sigma(\Delta_0 - \Delta(x))]$$

The spectrum visible to the spectrum analysis apparatus 22 thus includes modulation at a frequency which is characteristic of the difference between the optical path length differences in the sensor 14 and in the demodulator 18. Since the optical path length difference in the demodulator 18 is known, the path length difference in the sensor 14 can be deduced therefrom, and thus the value of the physical magnitude x to be measured can also be deduced.

The apparatus is preferably prior calibrated as follows:

By taking appropriate action on the demodulator 18, the beat frequency between the modulation due to the sensor 14 and that due to the demodulator 18 is caused to be such that the spectrum analysis apparatus 22 is insensitive thereto. The following condition then applies:

$$\delta\sigma \cdot |\Delta_0 - \Delta(x)| >> 1$$

which makes it possible to obtain the non-modulated portion of the light flux arriving at the spectrum analysis apparatus 22, i.e.:

$$\tfrac{1}{4} B(\sigma) \cdot T(\sigma)$$

Once this measurement is stored in memory, it suffices merely to multiply the analyzed light flux by its reciprocal to obtain a signal of the type:

$$1 + \tfrac{1}{2}\cos 2\pi\sigma(66_0 - \Delta(x))$$

It is also possible to subtract $\tfrac{1}{2}$ from this expression and to take out the factor $\tfrac{1}{2}$ to obtain an expression of the type $1 + \cos(ax)$, which is pure modulation.

Once these normalization operations have been performed, it is then possible, depending on circumstances, to measure the apparent color of the transmitted light flux, e.g. by means of a spectrocolorimeter, or else to measure the period and the phase of the periodic beat modulation in the analyzed signal directly.

The apparent color of the light flux is preferably measured when the beat frequency is low and less than the reciprocal of the spectrum width of the light source, i.e. when $$\Delta_0 - \Delta(x) < (\Delta\sigma)^{-1}$$

Conversely, when the beat frequency is greater than the reciprocal of the spectrum width of the light source, the corresponding period and phase of the modulation can be measured.

Another possibility consists in eliminating high frequency noise from h signal under analysis, e.g. by Fourier smoothing, since high frequencies have no bearing on he phenomenon under investigation, and since the maximum value of the beat frequency can be forecast a priori. The signal is then modelled in the form $1+a\cdot\cos(b)$ and the beat frequency is determined by adjustment (e.g. by a least squares method).

All of these operations of normalization, of measurement, and of calculating the beat frequency are performed by calculations in data processing means.

It is advantageous to select the optical path length difference in the demodulation interferometer 18 in such a manner as to ensure that it is always less than the optical path length difference in the sensor 14, whatever the value of the physical magnitude within the measurement range. This avoids ambiguity due to the cosine function being even.

Figure 2:
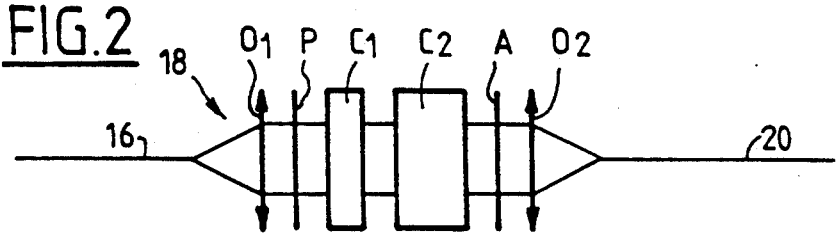
FIG. 2 is a diagram of an advantageous embodiment of the demodulation means.

FIG. 2 is a diagram of an advantageous embodiment of the demodulation interferometer 18. It is of the birefringent type including collimation optics $O_1$ having the end of optical fiber 16 at its focus; a polarizer P; a first birefringent crystal $C_1$ of thickness $e_1$ and of birefringence $\Delta n_1$, with its neutral axes being disposed at 45° to the transmission direction of the polarizer; a second birefringent crystal $C_2$, of thickness $e_1$ and of birefringence $\Delta n_2$, with its neutral axis being disposed at 45° to the transmission direction of the polarizer P; an analyzer A in a crossed or parallel position relative to the polarizer P; and optics $O_2$ for focusing the light beam into optical fiber 20.

The two crystals $C_1$ and $C_2$ can be oriented relative to each other in order to generate the following two path length differences:

$$\Delta_1 = e_2\Delta n_2 - e_1\Delta n_1$$

(when the slow axis of the crystal $C_1$ coincides with the fast axis of the crystal $C_2$)

$$\Delta_2 = e_2\Delta n_2 + e_1\Delta n_1$$

(when the slow axes of crystals $C_1$ and $C_2$ coincide).

By rotating one of the crystals through 90°, it is possible to pass from one path length difference to the other without inserting an additional optical component on the light path.

A suitable choice of crystals $C_1$ and $C_2$ makes it simple to perform the above-mentioned calibration of the apparatus followed by measurement per se, using the same demodulator having the same optical components, with path length difference $\Delta_2$ being used for calibration and with path length difference $\Delta_1$ being used for measurement, for example.

Figure 3:
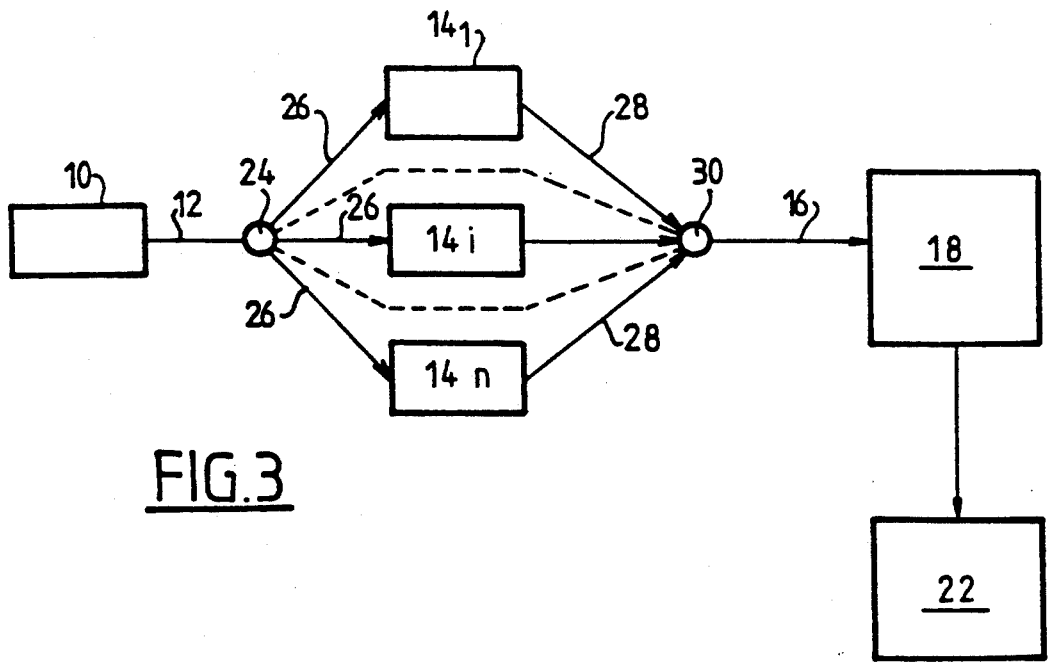
FIG. 3 is a diagram of another apparatus of the invention suitable for multiplexing and demultiplexing sensors disposed in parallel.

As shown in FIG. 3, the invention also makes it possible to multiplex and demultiplex information from a plurality of sensors, insofar as the characteristic modulation frequencies generated by the sensors are sufficiently different from one another.

The FIG. 3 apparatus thus comprises an incoherent light source 10 connected by an optical fiber 12 to a star coupler 24 which is in turn connected via optical fibers 26 to a plurality of sensors $14_1, \ldots, 14_i, \ldots, 14_n$ disposed in parallel. The sensors are connected by optical fibers 28 and a star coupler 30 to an optical fiber 16 leading to static demodulation means 18 which are in turn connected to spectrum analysis means 22.

The demodulation interferometer 18 is designed in such a manner as to enable it to be capable of being tuned to each of the sensors $14_1, \ldots, 14_i, 14_n$, i.e. its optical path length difference may take up values which are tuned to the optical path length differences in the various sensors. It is then possible to gain access sequentially to the values of the physical magnitude(s) measured by the sensors.

By way of concrete example, the sensor(s) 14 may be of the type described in the Applicant's above-mentioned United States Patents, and the demodulation interferometer 18 may be a Michelson interferometer or a birefringent interferometer as described with reference to FIG. 2, for example.

I claim:

1. A method of detecting and measuring a physical magnitude, the method comprising using a source of incoherent light to illuminate a sensor of the interferometric type and sensitive to the magnitude to be measured, modulating in a periodic manner the spectrum of the light flux passing through the sensor at a frequency which is a function of the magnitude to be measured, then statically demodulating the light flux leaving the sensor by means of a demodulator interferometer, analyzing the demodulated light flux spectrum to deduce the value of the physical magnitude therefrom, said analyzing step comprising using demodulated flux spectrum analysis apparatus having optical resolution such as to be insensitive to modulation frequencies generated by the sensor and by the demodulator, and analyzing solely that modulation in the demodulated signal which is characteristic of a beat frequency between the spectrum modulation due to the sensor and that due to the demodulator.

2. A method according to claim 1, characterized in that when the beat frequency is relatively large and greater than the reciprocal of the spectrum width of the light source, the method comprises measuring the period and the phase of said characteristic modulation in the demodulated signal.

3. A method according to claim 1, characterized in that when the beat frequency is relatively low and less than the reciprocal of the spectrum width of the light source, the method comprises measuring the apparent color of the demodulated light flux.

4. A method according to claim 1, characterized in that it comprises measuring the intensity of the non-modulated portion of the flux from the demodulator, by adjusting the demodulator or the sensor so that the spectrum analysis becomes insensitive to the above-mentioned beat frequency, and then, with the sensor subjected to the physical magnitude to be measured, multiplying the demodulated light flux by the reciprocal of the non-modulated portion of the flux in order to obtain a signal to be analyzed which is independent from the spectral transfer function of the set of means used.

5. A method according to claim 1 or 4, characterized in that it comprises eliminating high frequency noise present in the signal to be analyzed by means of Fourier smoothing, then modelling the signal, and determining the beat frequency by calculation.

6. A method according to claim 1, characterized in that the above-mentioned operations on the signal to be analyzed are performed by calculation in a data processing system.

7. A method according to claim 1, characterized in that it comprises connecting the source and the demodulator to a plurality of sensors disposed in parallel and having different characteristic modulation frequencies, and tuning the demodulator successively to each of the sensors.

8. Apparatus for detecting and measuring a physical magnitude, the apparatus comprising a source of incoherent light, an interferometric sensor sensitive to the magnitude to be measured and performing periodic spectrum modulation on the light flux emitted by the source, said modulation being at a frequency which is a function of the magnitude to be measured, static demodulation means for demodulating the light flux transmitted by the sensor, means for performing spectrum analysis on the demodulated light flux, and optical fibers for interconnected the source, the sensor, the demodulation means and the spectrum analysis means, and wherein the optical resolution of the analysis means is such as to ensure they are insensitive to modulation frequencies generated by the sensor and by the demodulation means, and are sensitive to the difference between said frequencies.

9. Apparatus according to claim 8, characterized in that the analysis means comprise means responsive to the analyzed signal for calculating the period and the phase of the characteristic modulation from the beat frequency between the modulation due to the sensor and the modulation due to the demodulator means.

10. Apparatus according to claim 8, characterized in that it includes means for measuring the apparent color of the demodulated light flux.

11. Apparatus according to claim 8, characterized in that it includes means for eliminating high frequency noise in the demodulated flux, e.g. calculation means performing Fourier smoothing on said flux.

12. Apparatus according to claim 8, characterized in that it includes a plurality of sensors disposed in parallel between the light source and the demodulator means, said sensors having different characteristic modulation frequencies, and the demodulator means being suitable for being tuned in succession to each sensor.

13. Apparatus according to claim 8, characterized in that the demodulation means comprise an interferometer having two birefringent crystals disposed between a polarizer and an analyzer whose transmission directions are crossed or parallel, with the neutral axes of the crystals being at 45° to the transmission direction of the polarizer, and means for rotating one of the crystals through 90° relative to the other, so as to tune the interferometer on an optical path length difference corresponding either to prior calibration or else to measurement.

* * * * *

UNITED STATES PATENT AND TRADEMARK OFFICE
CERTIFICATE OF CORRECTION

PATENT NO. : 5,200,796
DATED      : April 6, 1993
INVENTOR(S) : Michel R. Lequime It is certified that error appears in the above-identified patent and that said Letters Patent is hereby corrected as shown below:

Column 1, line 57, "is" should be -- it --.

Column 2, line 20, "form" should be -- from --.

Column 3, line 37, the equation should read as follows:
-- $B'(\sigma) = \frac{1}{2}B(\sigma) \cdot T_1(\sigma)[1 + \cos 2\pi\sigma\Delta(x)]$ --.

Column 3, line 65, after "where:" insert -- $T(\sigma)=$ --.

Column 4, line 11, after "apparatus" insert -- 22 --.

Column 4, line 44, the equation should read as follows:
-- $1 + \frac{1}{2}\cos 2\pi\sigma(\Delta_0 - \Delta(x))$ --.

Column 4, line 67, "h" should be -- the --.

Column 5, line 1, "he" should be -- the --.

Column 7, line 12, "interconnected" should be
-- interconnecting --.

Signed and Sealed this

Twenty-eighth Day of December, 1993

Attest:

BRUCE LEHMAN

*Attesting Officer*            *Commissioner of Patents and Trademarks*